Jan. 8, 1946.　　　　　P. SCHULTZE　　　　　2,392,775
APPARATUS FOR CONSTRUCTING PICKER ROLLS
Filed April 29, 1942　　　　5 Sheets-Sheet 1

INVENTOR
PAUL SCHULTZE
BY William T. Kuesma
ATTORNEY

Jan. 8, 1946.    P. SCHULTZE    2,392,775
APPARATUS FOR CONSTRUCTING PICKER ROLLS
Filed April 29, 1942    5 Sheets-Sheet 3

INVENTOR
PAUL SCHULTZE
BY William T. Kuesner
ATTORNEY

Jan. 8, 1946.　　　　P. SCHULTZE　　　　2,392,775
APPARATUS FOR CONSTRUCTING PICKER ROLLS
Filed April 29, 1942　　　5 Sheets-Sheet 5

INVENTOR
PAUL SCHULTZE
BY William T. Kuemer
ATTORNEY

Patented Jan. 8, 1946

2,392,775

UNITED STATES PATENT OFFICE 2,392,775

APPARATUS FOR CONSTRUCTING PICKER ROLLS

Paul Schultze, Danbury, Conn., assignor to Doran Brothers, Incorporated, Danbury, Conn., a corporation of Connecticut Application April 29, 1942, Serial No. 441,044

19 Claims. (Cl. 1—1)

This invention relates to an apparatus for the construction or assembly of high speed picker roll elements, such as the picker rolls or picker cylinders employed in apparatus for blowing or separating fur for felt manufacture.

One of the objects of this invention is to provide a practical and reliable apparatus for rapidly and efficiently assembling the picker pins to their support and in a manner to provide and maintain dynamic balance. Another object is to provide an efficient apparatus, capable of operating at high speed, for setting or embedding the shank ends of pointed picker pins rigidly and securely in their cylindrical support with such uniformity of distribution over the surface of the support and with such identity of distance from the axis of the rotary support as will achieve, at the high speeds of operation of the picker roll structure, good dynamic balance. Another object is to provide an apparatus for assembling picker elements, such as pins, to hollow rotary supports in a manner to insure interchangeability or replacement of the ultimate picker roll element.

Another object is to provide an apparatus that will be capable, at high rate of speed, of feeding the pointed pins, from a suitable supply or mass thereof in which they are haphazardly contained, always with the same one of their dissimilar ends headed in the same direction, to the pin-forcing device, but in a manner to insure continued rapidity of successive action of the device. Another object is to provide an apparatus of the just-mentioned character in which high speed of successive or intermittent action of the pin-forcing device may be dependably achieved without risk of the device missing a pin and hence interrupting the assembly operation. Another object is to provide an apparatus of the above-mentioned character in which the pin-forcing device may be operated with a simple intermittent or reciprocating motion and is synchronously supplied with pins in a manner to permit operation of the device at high speed.

Another object is to provide an apparatus for setting or embedding the shank ends of metal pins in a non-metallic base, such as a rotary support, made of a material like phenolic condensation product preferably laminated with textile or like fibrous material, and that will be capable of relatively high speed of operation and at forces or pressures to effect a strong and rigid securing of the pins in place. Another object is to provide an apparatus of the above-mentioned character that will be capable of so setting or embedding also threaded shank ends of the pins.

Another object is to provide an apparatus in which a reciprocating or intermittently operating pin-setting or pin-forcing device will have presented to it synchronously and temporarily guided or held in relation to it the pins to be set or forced into position in the rotary roller element, and in a manner to permit high rate of pin-setting operation and to achieve dependability of successive and rapid action. Another object is to provide a simple, efficient and dependable mechanism for co-relating and synchronizing the pin-supplying means with a means for assembling the pin to the pin-forcing device. Another object is to provide an apparatus for temporarily assembling a pin to a successively-acting pin-forcing device and which apparatus will be capable of simple and reliable construction and capable of high speed of operation and ease and simplicity of synchronization with the successive action of the pin-forcing device. Another object is to provide an apparatus of the just-mentioned character with simple, reliable and efficient means for preventing the pin-forcing device and the mechanism for temporarily assembling a pin to the latter from handling an improperly shaped pin or a pin reversed end for end where it has dissimilar ends.

Another object is to provide an apparatus of the above-mentioned character that will be of improved and compact construction, of reliable action, and well adapted to meet the varying conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of various possible embodiments of my invention.

Similar reference characters refer to similar parts throughout the several views of the drawings.

As conducive to a clearer understanding of certain features of this invention, it might here be noted that, in the fur felt industry, "blowing" machines are employed to effect separation from the desired fur fibres of heavier fur fibres and foreign or undesirable material, like pieces of skin, and that in such machines there are employed picker rolls that have to be driven at high rotary speeds, speeds on the order of 4,000 R. P. M., the separating action above mentioned taking place, in coaction with other elements, as a result of the high velocity imparted to the particles by the rapidly revolving picker rolls. In such actions, the heavier or undesired particles or materials are caused to exert centrifugal forces sufficient to discharge them tangentially away from the lighter or desired fur fibres, the latter being moved in the desired direction by air currents produced by the projecting picker pins of the high speed picker roll.

To achieve these actions requires high peripheral velocities and I have found that where the picker roll diameter is on the order of 4", a drive on the order of 4,000 R. P. M. is appropriate where the picker pins are closely set and project from the picker roll for about ¼". The pins are preferably of metal, such as steel, and where projecting ends are pointed the shanks may be plain or may have a multiple thread or large pitch thereon so as to cut their own thread when forced into the support.

At these high peripheral velocities and with the relatively substantial size or mass of the pins, there should be good dynamic balance of the picker roll and such a secure anchorage of the pins therein as to resist the components of centrifugal force tending to dislodge them, for loss of pins would not only diminish the action and efficiency of the picker roll but also effect unbalance. Moreover, the pins are very numerous. To provide a practical, efficient and high speed apparatus for uniformly distributing and assembling and anchoring such picker pins to a rotary picker roll element is one of the dominant aims of this invention.

Figure 1:
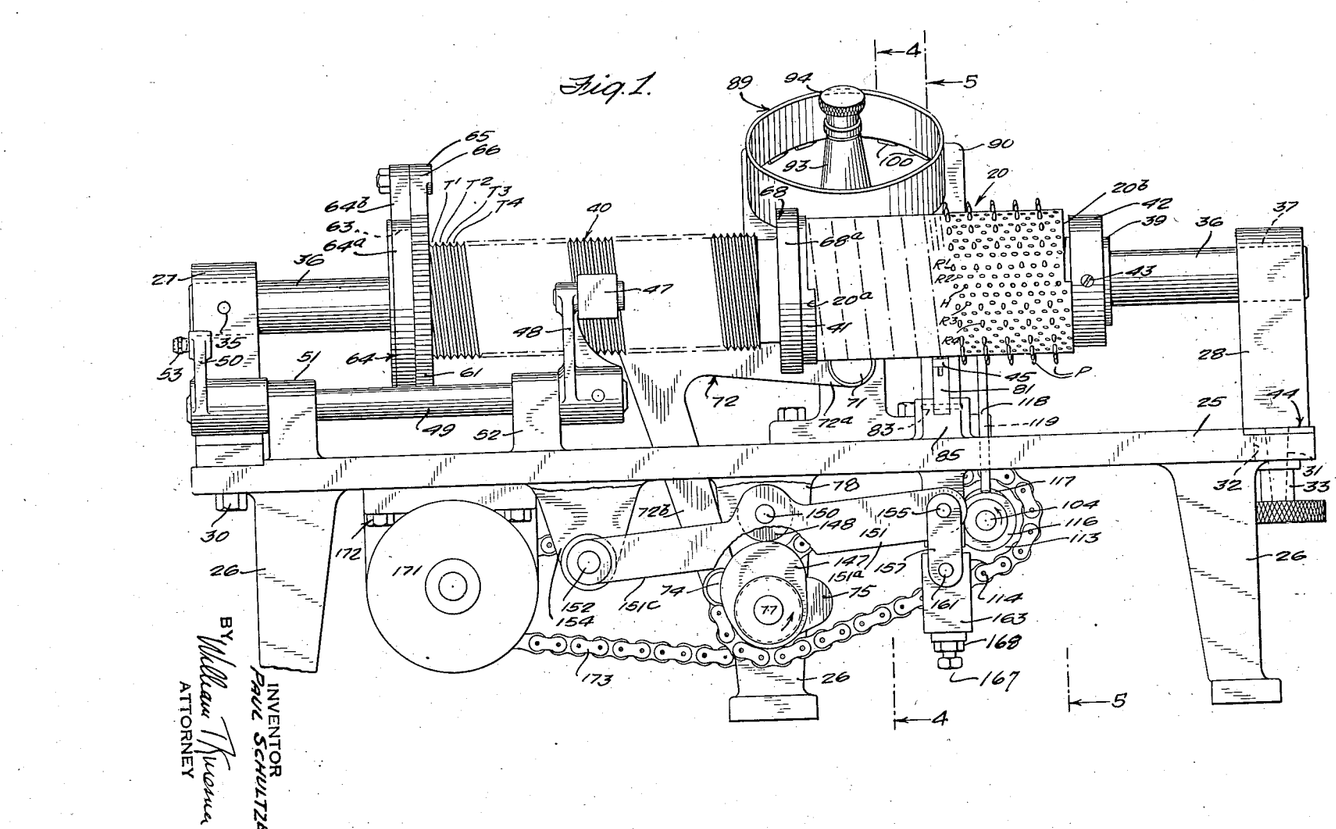
Figure 1 is a front elevation of the complete apparatus.
Figure 2:
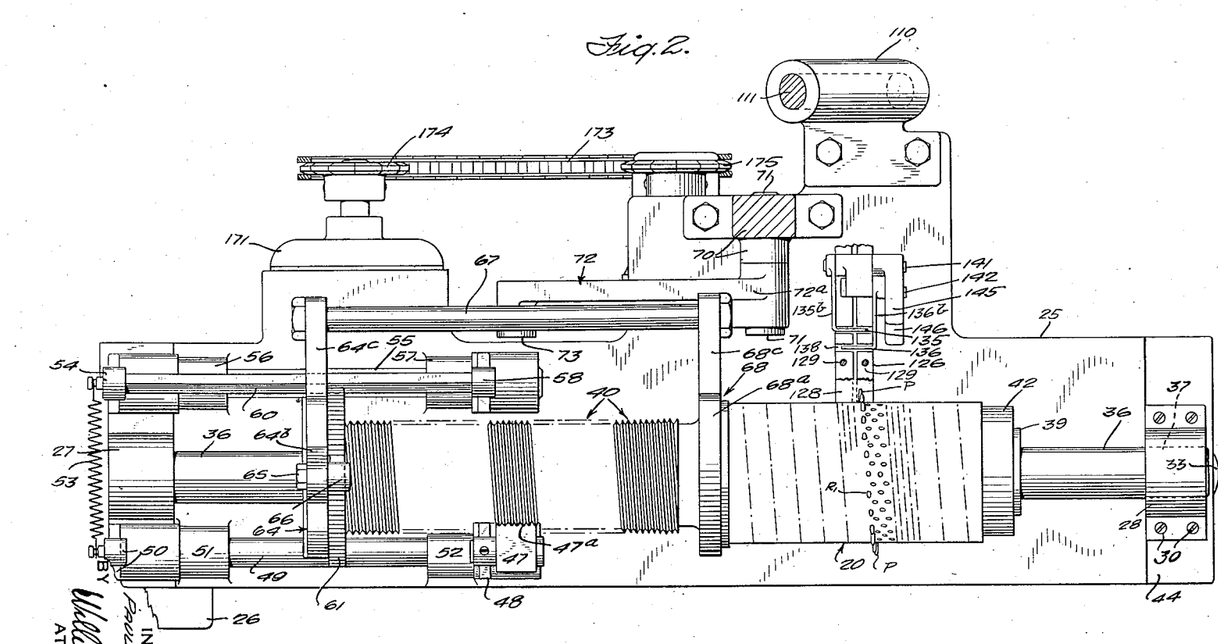
Figure 2 is a plan view thereof with certain parts omitted or broken away to show certain other parts more clearly.
Figures 5, 6:
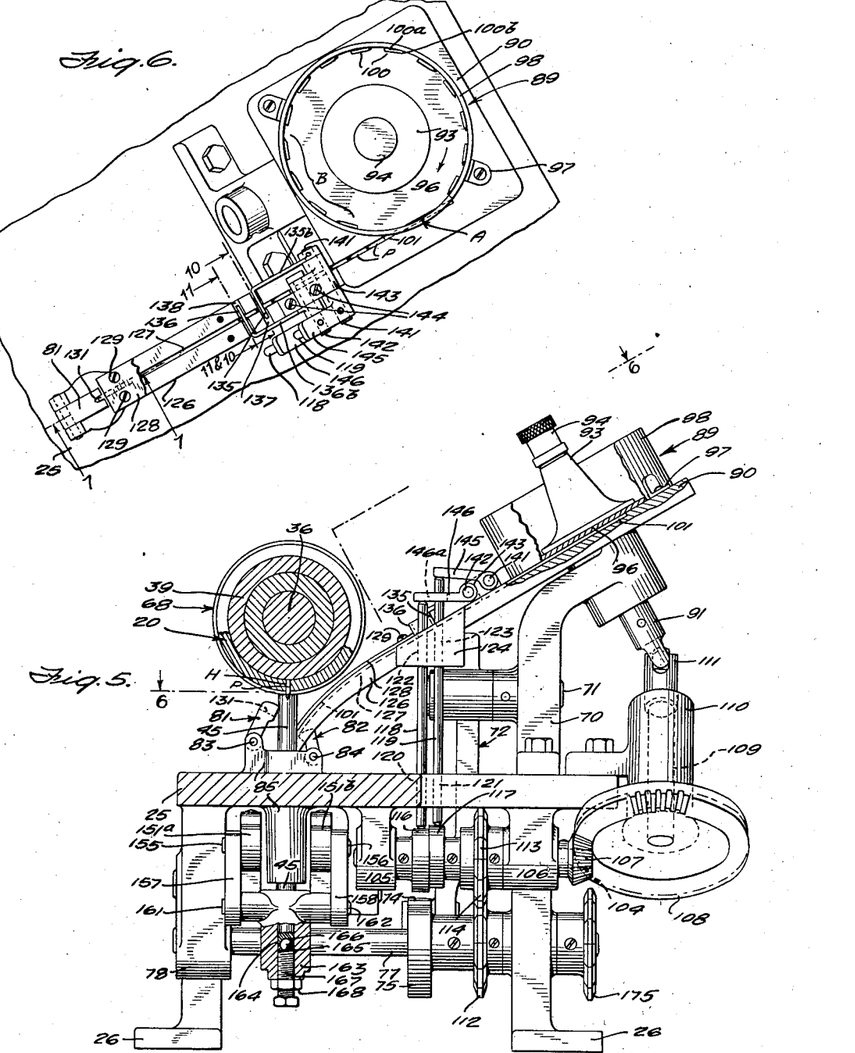
Figure 5 is a view as seen along the line 5—5 of Figure 1.
Figure 6 is a view of part of the apparatus as seen along the line 6—6 of Figure 5.

A preferred and illustrative form of rotary base or picker roll element for supporting and anchoring the pins comprises a tubular or sleeve-like element indicated generally by the reference character 20 in Figures 1, 2 and 5 of the drawings, being relatively thin-walled, made of a material of good tensile strength, and preferably of a mouldable material such as phenolic condensation product, preferably with fibrous material such as layers of suitable fabrics embedded therein and impregnated by and bound together with the phenolic condensation product. The sleeve element may have an inside diameter of 2¾", an outside diameter of $3\frac{3}{16}$", making a wall thickness of $\frac{7}{32}$". Such a sleeve element, of which several may be axially aligned, may be mounted upon a drum-like shaft of metal onto which it snugly fits and is sleeved and suitably secured thereto, and as so mounted may function in the above-mentioned fur blowing machines.

Figure 8:
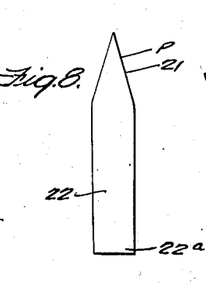
Figures 8 and 9 are elevations on a larger scale of illustrative forms of pins.
Figure 9:
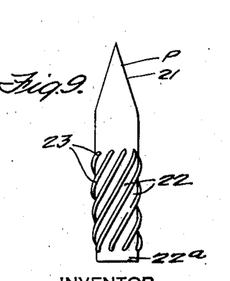

The pins P preferably take a form like those shown in Figures 8 and 9, being preferably of metal, such as steel, and being dimensioned to have good points as at 21 and good rigidity to resist the reactions of the mechanical forces exerted in the blowing machine; thus, they may be of a diameter on the order of $\frac{1}{16}$".

They have shanks 22 preferably cylindrical and in the form of Figure 9 the shank is provided with threads 23 of relatively large pitch and preferably terminating short of the stub end of the pin, thus to leave a portion 22a of the shank substantially free of threads and of a diameter on the order of the root diameter of the threads 23.

By any suitable means, the sleeve 20 is provided, as by drilling, with holes H preferably arranged in one or more helical rows, illustratively four helical rows $R^1$, $R^2$, $R^3$ and $R^4$, as indicated in Figure 1, analogous to a multiple thread of substantial pitch, the holes, as is better indicated in Figure 5, extending completely through the wall of the sleeve 20, the diameter of the holes H is somewhat less than the diameter of the shank 22 of the pins P where the latter are plain, as in Figure 8, so that the fit of the shank into a hole is analogous to a force fit, and where pins of steep pitch threads are employed as in Figure 9, the diameter of the holes is just about equal to the root diameter of the threads 23 so that the threads have to cut themselves a corresponding threaded pathway into the material of the sleeve 20, the pin undergoing rotary movement in the process. The tough character of the material of sleeve 20 thus causes it, in either case, to securely grip and envelop the shank of the pin when the latter is forced home, the shank becoming in effect tightly embedded and securely anchored in the material. The great number of pins are to be assembled to the sleeve with a security or anchorage like that above mentioned and moreover with their centers of mass equidistant from the axis of the sleeve.

The apparatus for effecting such assembly comprises a base 25 with supports or legs 26, and upstanding from the base 25 are standards 27 and 28 of which standard 27 is rigidly and fixedly secured as by the screws 30 and standard 28 is detachably secured to the base as by a threaded stud 31 projecting downwardly from the standard 28 through an open-ended slot 32 in the base 25, threaded stud 31 receiving a hand-operated clamping nut 33. In standard 27 is rigidly anchored, as by a pin 35, a relatively heavy and strong shaft 36 whose opposite end enters a hole 37 in the standard 28, thus to support the right-hand end of the shaft 36.

Shaft 36 rotatably and slidably supports a cylindrical structure of which the right-hand portion is in the form of a mandrel 39 of a length appropriate to receive thereon the sleeve 20 and of which the left-hand portion is threaded as at 40, the portion 40 having thereon threads which in number and pitch correspond to the number and pitch of the rows of the holes H in the sleeve 20. Thus, where the latter has four rows or helixes, portion 40 has four threads, $T^1$, $T^2$, $T^3$ and $T^4$.

Suitable means are provided for fixing the position of the sleeve 20 relative to the threads of element 40. Since, in the preferred construction of the above-mentioned picker rolls, I prefer to sleeve several sleeves 20 onto the driving and supporting drum or shaft and since for that purpose I provide the peripheral ends of the sleeves with cut-outs 20ª and 20ᵇ, preferably each of 180° extent and displaced from each other by 180° so that successive sleeves interfit and interlock at their adjacent ends, I prefer to utilize such stepped or cut-out ends of the sleeve for fixing its position relative to the threaded part 40 and hence, intermediate of the parts 39 and 40 I may provide an annular shoulder 41 presenting at its right-hand end, as viewed in Figure 1 a step or cut-out of 180° extent with which the left-hand end of sleeve 20 interfits and thus holds the sleeve 20 against rotation relative to the mandrel 39, as is clear from Figures 1 and 2, and onto the end of mandrel 39 I may slip a collar 42 temporarily anchored as by a set screw 43 to hold the sleeve 20 against axial movement out of interlocking relation with the shoulder 41.

In drilling the helical row or rows of holes H the start of each helix is properly related to the cut-outs 20ª and 20ᵇ of the sleeve so that hence all drilled sleeves that are in succession related to the mandrel 39 to have the pins forced into their holes have their helix or helixes of holes always properly related to the threaded member 40 and also to the fixed point in the apparatus, later described, where the pin is to be driven home.

By loosening up the hand nut 33, the standard 28 may be slipped off toward the right, leaving the shaft 36 supported as a cantilever from the standard 27, whence, after loosening the collar 42, the collar and the sleeve 20 may be slipped off the mandrel 39 and right-hand end of shaft 36, to be replaced by another, by a reverse sequence of steps, it being noted that the base 25 is suitably shaped as at 44 to form a seat for the standard 28 and thereby fix the position to which it is returned.

The mandrel 39 has an outside diameter to snugly receive the sleeve 20 thereover, so that the cylindrical surface of mandrel 39 closes off and forms the bottoms for all of the holes H in the sleeve 20 (see Figure 5). The structure 39—40 may be made hollow or tubular, if desired, excepting of course at those portions, such as the ends, where it is bored to a diameter to form a sliding and rotary fit relative to the fixed shaft 36.

The shaft 36 is of sufficient extent relative to the length of the structure 39—40 to give a range of sliding movement sufficient to traverse the entire length of the sleeve 20 relative to the point where the apparatus operates to force a pin into a hole in the sleeve, and in the form shown in the drawings, that point is in the vertical axis of a vertically moveable pin-forcing device which includes a plunger 45, preferably located underneath, and in line with the vertical plane through, the shaft 36. As shown in Figures 1 and 2, the sleeve 20 is at a point substantially halfway of its sliding traverse along shaft 36.

Coacting with the threaded element 40 is a block 47 having a face 47ª (Figure 2) that is curved and threaded to mate with the threaded surface of the part 40, being like a segment of a nut.

Block 47 is held against movement lengthwise of the guiding shaft 36 but is mounted to be moved toward or away from threaded element 40 so as to engage or disengage its thread. Conveniently, it is supported on an arm 48 fixed to a shaft 49 that has an arm 50 fixed to its other end, shaft 49 being supported in two upstanding bosses 51 and 52 in which it and the arms may oscillate as a unit and by which this unit is held against axial movement.

Suitable means are provided to hold the block 47 in engagement with the threaded part 40 and such means preferably comprises a spring 53 connected to arm 50 and to an arm 54 (Figures 2 and 3) secured to a shaft 55 supported in bosses 56 and 57 projecting upwardly from the base 25 like the bosses 51—52 that support shaft 49.

Shaft 55 can swing in the bosses 56—57 but is held against axial movement by the engagement of arm 54 with the boss 56 and by the engagement of an arm 58 at its other end with the boss 57. Arms 54 and 58 extend upwardly and in parallelism (Figures 2, 3 and 4) and in their upper ends fixedly support the ends of a holding pawl 60 which, being conveniently in the form of a square rod, presents throughout its length, which is at least equal to the traverse stroke of the structure 39—40, a single tooth-like portion for coaction with a toothed ratchet wheel 61 mounted or formed at the left-hand end of the rotary and slideable structure 39—40. Thus holding pawl 60 may coact with the ratchet wheel 61 at any point in the axial movement of the wheel 61 whose teeth are in number the same as the number of holes H in a single turn of the sleeve 20 or of the helical row of holes.

Spring 53 will thus be seen to bias the threaded block 47 into engagement with the threads of part 40 and to bias also the holding pawl 60 into proper coaction with the ratchet wheel 61, and normally holds each of them in its proper coacting relation. But pawl 60 may be disengaged from ratchet wheel 61 manually simply by swinging it away from the ratchet wheel and against the tension of spring 53 and in a similar way block 47 may be manually disengaged from the threaded part 40.

Figure 3:
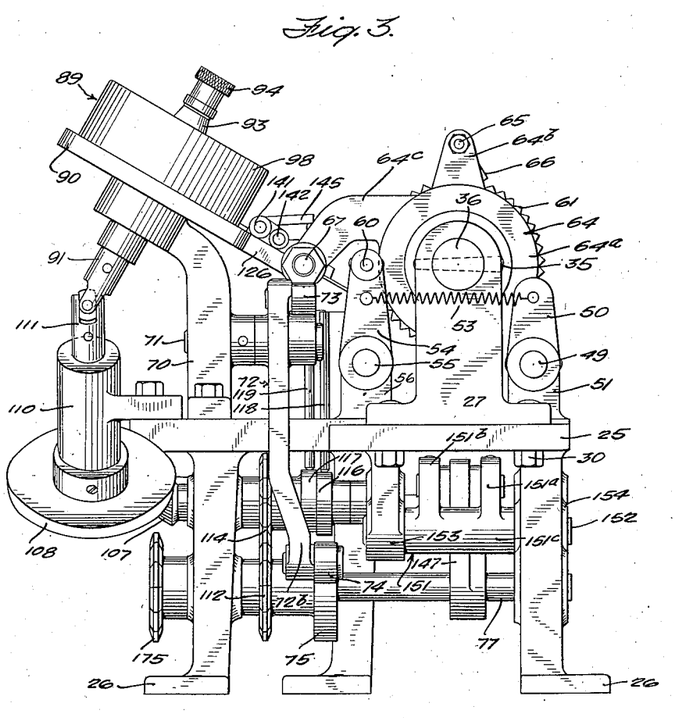
Figure 3 is an end elevation as seen from the left in Figure 1.
Figure 4:
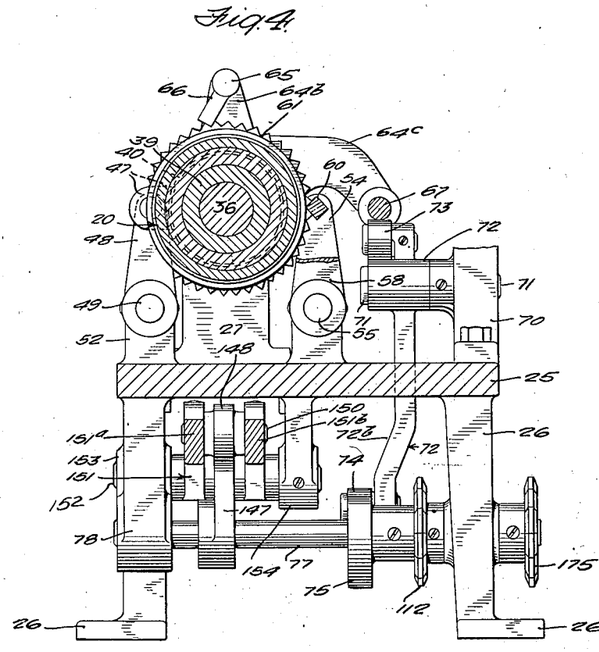
Figure 4 is a sectional view as seen along the line 4—4 of Figure 1, certain parts being broken away or omitted.

To the left of ratchet wheel 61, as seen in Figures 1 and 2, the structure 39—40 is constructed as at 63, to provide a bearing for the hub 64ª of a bell crank lever 64 having an upwardly directed arm 64ᵇ by which is pivotally carried, as by the pin 65 a pawl 66 urged in any suitable way, as by its own weight, into coacting relation to the ratchet wheel 61 (see Figures 3 and 4).

The other arm 64ᶜ of the bell crank lever 64 extends rearwardly and downwardly and has secured to it one end of a rod 67 whose other end is rigidly secured to the arm 68ᶜ of a lever 68 whose hub 68ª has a bearing co-axial with the bearing of hub 64ª of lever 64, and this bearing is conveniently and preferably formed in the left-hand portion of the shoulder 41 (Figures 1 and 2) of the structure 39—40.

A bracket 70 secured adjacent the rear end of the base 25 carries a horizontal pin 71 (Figures 2, 3 and 4) which forms a horizontal pivot for one arm 72ª of a V-shaped lever 72 (see Figure 1) at whose apex is mounted a roller 73 which is thereby positioned underneath the rod 67, and whose other arm 72ᵇ extends downwardly through a suitable aperture in the base 25 and has mounted on its end a roller or cam follower 74 for coaction with a cam 75.

Cam 75 is mounted upon a shaft 77 extending transversely of and below the base 25 from which extend downwardly suitable means such as an arm 78 and one of the legs 26 suitably bored or provided with bearings for the shaft 77.

By means of the rotating cam 75, the lever 72 is actuated in clockwise direction about its pivot pin 71 (as viewed in Figure 1) and given a return stroke, once for each revolution of the cam 75 and at a suitable point in its rotation, cam follower 74 being held in coaction with the cam 75 in any suitable way as, for example, by the weight of the lever 72 and the weight of the rod 67 and the lever arms 64° and 68° which tend to swing downwardly or in counter-clockwise direction, as viewed in Figure 3.

Accordingly, upon the upward swing or stroke of lever 72 (Figure 4) roller 73 moves upwardly and, being in engagement with the rod 67 irrespective of the position of the structure 39—40 lengthwise of the guide shaft 36, moves the latter upwardly and thus moves the pawl 66 in counter-clockwise direction to rotate the ratchet wheel 61 and hence the structure 39—40 by an amount equal to the distance between two teeth of the ratchet wheel 61, the angle of movement corresponding to the angle subtended by two successive holes H in a helical row of holes in the sleeve 20, the holding pawl 60 yielding toward the right as this rotary movement commences and being in effect cammed out of the space between two teeth but being entered into the next succeeding space under the bias of spring 53, thus not only to hold the structure 39—40 in its new position, but also, by bottoming in the succeeding space, accurately fixing the step or rotary movement to the above-mentioned angle.

And as that rotary movement takes place, the coaction between the threaded part 40 and the block 47 (Figure 1) effects a movement of translation of the structure 39—40 along its guiding support 36, and with the actuating pawl moving in the direction above described and with the threads on part 40 being as shown in Figure 1, that step of rotary movement is accompanied by a step of traverse of the structure 39—40 in a direction toward the right as viewed in Figure 1.

There is thus brought into alignment with the vertical axis of plunger 45 the next succeeding hole H of the particular helix of holes being operated upon.

Figure 7:
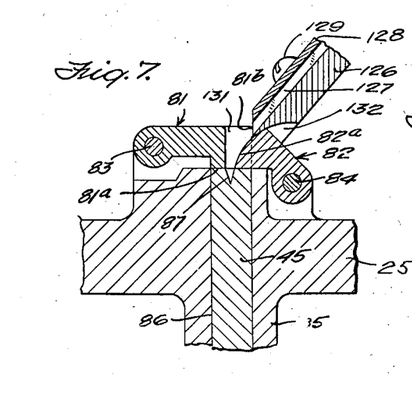
Figure 7 is a detached vertical sectional view as seen along the line 7—7 of Figure 6.

Plunger 45, at the conclusion of the just-described movements is in lowermost position, a position better shown in Figure 7 and it is brought into that position, by mechanism about to be described, in order to achieve the actuation of separable throat elements which in Figures 5 and 7 are shown as comprising two pivotally mounted members 81 and 82. These members are pivotally mounted on pins 83 and 84 carried in spaced ears formed in the upper portion of a boss 85 preferably formed integrally with the base 25 and bored or drilled as at 86 to form an accurate guide for the cylindrical plunger 45 to guide its axis preferably in a line at right angles to, and intersecting, the axis of the mandrel 39 and hence of the sleeve 20.

The separable throat elements 81—82 are biased toward each other and toward the line of vertical movement of the plunger 45, in any suitable way, and conveniently this may be achieved by so shaping and pivoting them that their respective weights effect the desired bias, though it will be understood that springs may be employed if desired.

With plunger 45 in its lowermost position as in Figure 7 and being provided, in line with its axis, with a tapered hole or recess 87 that is conformed generally to the shape of the pointed or tapered ends 21 of the pins P (Figures 8 and 9), a pin P is supplied to the plunger 45 and injected into the recess 87 pointed end first, from a supply magazine generally indicated by the reference character 89 and by coacting mechanism to insure that no pin is supplied to the plunger reversed end for end and to insure reliable assembly of the pin to the plunger, during the short interval of time available.

Magazine 89 comprises a base plate 90 supported at an incline by an upward and rearward extension of the bracket 70 and extending centrally through the plate member 90 and having a suitable bearing in the outer end of bracket 70 is a shaft 91 at whose upper end is secured a somewhat conically shaped hub 93, being preferably detachably secured in any suitable way as by the thumb nut 94; at the lower end of hub 93 is secured a circular plate 96 of a thickness on the order of the diameter of the pins P, and extending about the periphery of the rotary disk 96 is a cylindrical wall 98, parts 96 and 98 together forming a container into which a suitable quantity of pins P are placed. Brackets 97 secure part 98 to the base 90.

At the outer periphery of the bottom or plate element 96, which rests snugly and flatwise against the upper face of the frame plate 90 and relative to which it rotates, and within the circular or cylindrical boundary formed by the inner face of the wall element 98, I provide in the member 96 a series of apertures or recesses 100 which have substantially the same shape as the pins P as the latter are viewed in Figures 8 and 9 or as they are shaped in central longitudinal cross-section and hence each recess or slot 100 has a portion 100$^a$ corresponding to the shank part 22 of the pins and a tapered forward portion 100$^b$ corresponding to the tapered or pointed portions 21 of the pins, and as shown in Figure 6, the apertures or slots 100, preferably substantially equidistantly spaced are arranged in succession but with the tapered portions 100$^b$ of all of them heading in the same direction.

As the disk plate 96 is rotated in clockwise direction in Figure 6, its underface moves relative to the frame plate 90 and its upper face, upon which the haphazardly arranged mass of pins rests, tends to drag the pins along with it, but due to the tilt of the structure as better appears in Figure 5, the mass of pins tends to gravitate and remain somewhat concentrated within the lower left hand portion of the container 96—98.

This gravitation, aided by the rotary movement of the bottom plate 96, insures the lining up of the pins tangentially and in the general region of the apex of the angle between the wall 98 and the bottom plate 96 where they are of lowest elevation, and individual pins tend to hug into that apex. Such of them as do so with their pointed ends heading clockwise (Figure 6) fall into the slots 100, one by one, as the slots are successively brought through the region of lower elevation of the magazine, resting against the frame plate 90 relative to which they are carried or moved clockwise.

Such of the pins as are not thus trapped in a slot 100, for example, pins that have their shank ends headed in clockwise direction, cannot register with and enter a slot, but in the process of being agitated and moved around by the slow rotation of the plate 96 eventually become turned end for end, gravitate into the above-mentioned apex, and enter or are trapped by the slots 100, and thus start upon their controlled movement of translation about the axis of the magazine.

In the frame plate 90 is formed a straight channel 101 of a depth and width adequate to accommodate pins P, as shown in Figures 5 and 6, and channel 101 extends in a direction so that it partakes of the incline of the frame plate 90 and so that it underlies the rotary bottom plate 96 and is tangent to the circle along which the midpoints of the slots 100 are aligned. This relationship of tangency is generally indicated in Figure 6 at A.

Accordingly, pins P which become seated in the slots 100 as the latter traverse the region substantially like that indicated at B, are transported in clockwise direction from the region B and as the slots 100 are successively brought to the region A of tangency and hence successively brought into a position overlying and aligned with the channel 101, the pins, no longer finding support upon the upper face of the frame plate 90, drop into the channel 101 and due to its inclination slide downwardly toward the left as viewed in Figure 5, along the channel. Should the channel 101 be filled throughout its length by pins P, the pins in the channel 101 prevent the pin in a slot 100 from dropping into the channel 101 and any such pin remains in the slot 100 and has to make a 360° circuit of movement before it is again presented at the region of tangency to the channel 101.

The number of slots 100 and the rate of drive of the slotted plate 96 are such that, even allowing for failure of pins to enter some of the slots during a single rotation, pins are presented at the region A of tangency at a rate greater than the rate at which the plunger 45 can assemble the pins to the sleeve 20 as the latter is given step by step rotary and traverse movements, thus to insure against gaps in any helical row of pins on the sleeve 20.

The shaft 91 (Figure 5) of the magazine structure is preferably driven from an auxiliary shaft 104 rotatably supported preferably underneath the frame 25 in suitable spaced bearing bosses 105 and 106; driving connection from shaft 104 to the magazine shaft 91 may be effected by reduction gearing such as the small bevel gear 107 on shaft 104 driving the large bevel gear 108 on a shaft 109 extending upwardly and at an incline through a bearing support 110 secured to the base 25, whence shaft 109 and magazine shaft 91 are connected by any suitable form of flexible or universal joint indicated at 111.

Shaft 104 (Figure 5) is preferably driven in synchronism or timed relation with the main drive shaft 77 above mentioned, and a convenient driving connection between the two, for this purpose, may comprise sprockets 112 and 113 and a chain 114. This timed relationship I effect because I prefer to actuate from shaft 104 certain mechanisms which coact with the above-mentioned separable throat elements 81—82 and with the above-described magazine construction, particularly with the action that takes place at the region A of tangency, and conveniently I actuate such mechanisms from cams 116 and 117 (Figures 3 and 5) mounted upon shaft 104.

In Figure 1, cam 116 is seen in side elevation to indicate the general character of its shape and cam 117 is of the same shape but is displaced from cam 116 by a suitable number of degrees as later pointed out. Coacting with these two cams are cam followers 118 and 119, conveniently in the form of vertically extending rods, biased into cam-following relation by any suitable means, conveniently by their own weight, and provided with any suitable means, such as apertures 120 and 121 in the base 25 and apertures 122 and 123 in a block 124 adjacent their upper ends, for slideably supporting and guiding them.

Block 124 is secured to or supported from an elongated downwardly inclined member 126 rigidly secured at its upper end to the magazine frame plate 90 and having formed in its upper face a channel 127 which is aligned with the channel 101 in the frame plate 90 and forms in effect a continuation thereof, and preferably throughout the lower extent thereof as seen in Figure 5, the channel extension 127 is covered over as by the strip-like member 128 removably secured in place as by screws 129. Throughout its lower portion it may be given a suitable degree of curvature to bring the lower end or terminus of the channel extension 127 at a greater inclination and in better alignment with the separable throat elements 81—82 which, in turn, form substantially an extension of the channel extension 127 (see Figure 7).

The pivoted throat element 81 (Figures 6 and 7) has at its right-hand end a bottom face 81ᵃ that registers with the upper face of plunger 87 when the latter is in the position shown in Figure 7 and at its right-hand end it terminates in a slightly curved and almost vertical face 81ᵇ and is slotted as at 131, the slot having parallel side walls spaced apart by a distance equal to the width of the channel extension 127 with which the open end, in the vertical face 81ᵇ, of the slot 131 is in alignment, while the left-hand wall of the slot 131 extends vertically (Figure 7), being shaped so that a pin, entering the recess 87 in the plunger 45 pointed end first, just about contacts the U-shaped (see Figure 7) walls of the slot 131 as the pin snugly seats itself in the tapered recess 87 and assumes a true, upright position.

The throat element 82 is of a thickness to pass freely into the slot 131 through the right-hand open end thereof in throat element 81, and it has a pin-engaging or guiding face 82ᵃ whose right-hand end is in alignment with the bottom face of the channel extension 127 (Figure 7) and whose left-hand end is substantially tangent to the tapered recess 87 in plunger 45, it being noted that this edge face 82ᵃ may conveniently be curved and may have the axis of pivoting of throat element 82 as its axis of curvature. Along the lower underside of the channel member 126 and in line with the channel 127 therein, there is formed or milled a slot 132 preferably intersecting the bottom of the channel extension 127, so that the edge face 82ᵃ may align itself neatly as an extension of the bottom of the channel 127 and also so that throat element 82 may be swung in clockwise direction out of the path of upward movement of plunger 45, as shown in Figure 5. Both throat elements 81—82, when swung upwardly and away from each other by the upper end face of the plunger 45 as the latter moves upwardly from the position shown in Figure 1, ultimately assume the respective positions shown in Figure 5 which they are given by the co-action with the throat elements of the external cylindrical face of the plunger 45 against which, and in co-action with which, they are maintained by the pull of their own respective weights which, as earlier noted, bias them, about their pivots, to swing toward each other.

Accordingly, with the parts in the position shown in Figure 7, a pin, controlled as above and later described, may slide down the channel extension 127 at considerable velocity, the time elements being short and the inclination of the channel carrying element 126 being appropriately steep. This occurs with the plunger 45 lowered from the position shown in Figure 5 to the position shown in Figure 7, throat elements 81 and 82 being restored to throat-forming relation to both the plunger recess 87 and the channel extension 127. This restoration of the throat elements 81 and 82 is effected by the co-action therewith of the plunger 45 against the external cylindrical face of which they are biased or urged by their own weights so that downward movement of the plunger 45, from the position in Figure 5 to the position shown in Figure 7, in effect cams them into throat-forming relation by an action reverse from that in which the plunger 45 in effect cams them out of its way and into the position shown in Figure 5.

Emerging from the terminus of channel extension 127, pointed end first, the speedily moving pin is now precluded from bouncing or from falling over or from improperly entering its pointed end into the plunger recess 87. The parallel side walls of the U-shaped slot 131, in throat element 81 (see Figure 7), prevent the pin from wobbling sideways (that is, in an up or down direction as viewed in Figure 6) and the left-hand wall of the slot 131 in coaction with the inclined or curved throat surface 82ª effect a neat and positive guiding of the point of the pointed end into the wide upper end of the tapered recess 87, the curvature or inclination of the wall surface 82ª bringing the pin progressively more and more into an upright position and hence into alignment with the vertical axis of the recess 87 and plunger 45. The left-hand wall of slot 131 limits the extent of this tilting of the pin (in counterclockwise direction as viewed in Figure 7), and thus prevents any tendency of the pin to oscillate as it seats its pointed end in the tapered recess 87, and thus insures against delay in proper seating of the pin, only a very short interval of time being available.

While these actions are taking place, the magazine 89 continues to bring pins successively to the region A of tangency but the supply of another pin to the channel extension 127 must be prepared and held in readiness and at the same time jamming of pins at the region A of tangency, with resultant jamming of the channel 101 and of the rotary magazine, should be guarded against. Here I prefer to utilize the timed actuations of the cams 116 and 117 and arrange their cam followers 118 and 119 to control, in proper timed relation, two gates 135 and 136 (Figure 6) which are related to the channel 101—127 and to the region A of tangency.

Figure 10:
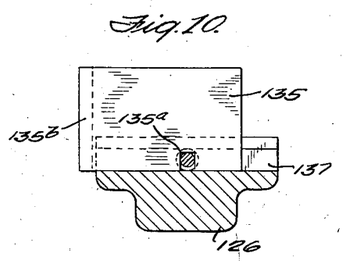
Figure 10 is an elevation, partly in section as seen along the line 10—10 of Figure 6.
Figure 11:
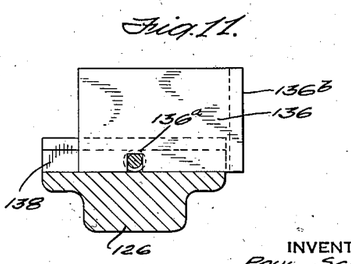
Figure 11 is an elevation, partly in section, as seen along the line 11—11 of Figure 6.

Gates 135 and 136 (see Figures 2, 10 and 11) extend transversely of the above-mentioned channel, being spaced lengthwise thereof by a distance equal substantially to the length of a pin, and the bottom edges of the gates bottom in slots 137 and 138 respectively that extend transversely of the channel carrying member 126 and that are of a depth equal to the depth of the channel extension 127. The gates have relatively narrow slots 135ª and 136ª (see Figures 10 and 11) formed in them from their lower edges, the slots being of a width less than the shank portions 22 (Figures 8 and 9) of the pins so that, when in stopping position, each gate may straddle a portion of the tapered end of a pin and thus hold it from moving along the channel, and as shown in Figure 6, with gate 136 holding a pin P as just stated, gate 135 may straddle and hold the next succeeding pin P against downward movement in the channel, even though its pointed end touches the flat or stub end of the pin stopped by the gate 136.

With the pins all of the same length, and lying in end to end contact in the channel 101 (Figure 6), the gate 135 is positioned at such a point or distance from the region A of tangency that, assuming the inclined channel 101 to be completely filled with the gate 135 in stopping position, the uppermost pin of the row of pins in channel 101 is just about at that point in the region A of tangency where it was when it dropped from a slot 100 into the channel 101, so that a succeeding pin brought by the bottom plate 96 to the region of tangency cannot fall or drop into the channel 101 and slides over the pin already at that point without becoming jammed. Hence element 96 with its slots 100 does not drop a pin into channel 101 unless and until gate 135, in coaction with gate 136 as later described, permits a downward advancing movement of the pins in channel 101 by the distance of the length of one pin, thus clearing a space in the channel 101 at the region A of tangency for a succeeding pin to drop into it.

Just about when plunger 45 and the throat elements 81—82 reach the relationship shown in Figure 7 and described above in detail, cam 116 lifts the gate 136 upwardly away from cross slot 138 (Figures 5 and 6), thus releasing the pin theretofore held by the gate 136, cam 117 during this action leaving gate 135 in closing position and entered into the slot 137, thus to hold back the pins that are lined up in channel 101 between the gate 135 and the region A of tangency. The single pin thus released rapidly slides down along the steeply inclined channel extension 127 and becomes assembled to the recess 87 in plunger 45 in the manner above described.

The upward stroke of plunger 45 now commences and also the gate 136 is returned to closing position and gate 135 is moved to releasing or open position, allowing the aligned pins in channel 101 to slide downwardly by a distance equal to the length of a pin, the foremost pin and hence the moving row of pins being stopped by closed gate 136. Thus also the channel 101 in the region A of tangency is cleared for the reception of another pin.

The channel 101 is preferably of a length appropriate to accommodate a suitable number of pins, such as that suggested in Figure 6, so that gates 135 and 136 may function to release individual pins to the throat and plunger in the event that several slots 100 should be brought around to the region A of tangency in an empty condition.

The gates 135 and 136 have arms 135ᵇ and 136ᵇ pinned or otherwise secured to shafts 141 and 142 respectively mounted in bearings formed in a bearing block 143 secured as by screws 144 to the upper face of the channel carrying member 127, and shafts 141 and 142 have secured to them lever arms 145 and 146 which at their outer ends (Figure 5) overlie and are engaged by the cam follower rods 119 and 118 respectively. Any suitable means may be employed to bias the gates into closing position, and conveniently the weight of the parts, including the weight of the lever members 145 and 146 may serve that purpose, acting also to maintain the lever arms in engagement with the cam follower rods. Preferably lever arm 145 overlies lever arm 146, the latter being suitably apertured as at 146ª to permit the free passage therethrough of cam follower rod 119 into engagement with the lever arm 145.

The above-mentioned upward stroke of plunger 45 and control of its return stroke is preferably achieved by a cam 147 on the main drive shaft 77 (Figures 1, 3 and 4), shaped as shown in Figure 1, with the drive of shaft 77 being counter-clockwise. Coacting with cam 47 is a cam follower or roller 148 rotatably supported by a pin 150 between the bifurcations 151ª and 151ᵇ of a lever 151, whose left-hand end 151ᶜ, as seen in Figure 1, is pivotally supported by a shaft or pin 152 carried by two spaced bosses 153 and 154 projecting downwardly from the base 25.

At the right-hand end as seen in Figure 1, the lever parts 151ª—151ᵇ, which extend to either side of the downwardly extending guiding boss 85 for the plunger 45 (Figure 5), have pivotally secured to them, as by pins 155 and 156, links 157 and 158 respectively which, at their lower ends, pivotally engage as by pins or trunnions 161 and 162 a plunger carrier 163 of appropriate vertical extent and having a vertical bore or hole 164 therein in which is received the lower end of the plunger 45.

Where the pins P are threaded, as in Figure 9, so that the pin undergoes rotary movement as it is forced under substantial pressure into a hole H in the sleeve 20, the plunger 45 is preferably supported in the carrier 163 so that the plunger also may partake of rotary movement with the pin. For this purpose I preferably interpose between the lower end of plunger 45 and the bottom of the bore 164 a hardened steel ball 165 (Figure 5) preferably giving the end face of the plunger 45 a concavity to form a seat 166 to hold the ball 165 coaxially of the plunger 45, thus to bring its point of tangency with the bottom of the bore 164 in coincidence with the vertical axis of the plunger and thus insuring ease or nicety of rotary movement of the plunger relative to its carrier 163.

Whether or not the plunger 45 is mounted for rotary movement, I preferably provide suitable means for adjusting the extent to which the upper end of the plunger 45 approaches the axis of the mandrel 39 (Figure 5), in order to facilitate accommodating the apparatus to various requirements such as changes in diameter of the sleeve 20, different lengths of pins, and the like, but also to insure that, for given conditions, the upward stroke of plunger 45 is such as will bring the end faces of all of the pins, whether the latter are threaded or not, into coincidence with the inner cylindrical surface of the sleeve 20 and against the outer cylindrical face of the mandrel 39.

A convenient and preferred means comprises a screw 167 threaded into the lower end portion of the bore 164 of the carrier 163, the end face of the screw 167 thus forming the bottom wall of the socket-like bore 164 into which the lower end of the plunger 45 is seated, and with otherwise fixed stroke of up and down movement of the carrier 163, as by the lever 151 and cam 147 (Figure 1), the plunger 45 may be raised or lowered relative to the carrier 163, by adjusting the screw 167 which may be locked as by the lock nut 168, thus permitting accurate fixing of the upper limit of movement of the upper end face of the plunger 45.

As above noted, the plunger 45 is nicely guided in its up and down stroke by the bore 86 in the guiding bosses 85, and due to the connection of carrier 163 to the lever 151 by the links 157—158, the carrier 163 follows the straight line of up and down motion determined by the guiding of the plunger 45 in the bore 86, the links 157—158 partaking of a slight amount of swing (see Figure 1) about their lower pivotal connections 161—162 as the axis of the upper pivotal connections 155—156 to the lever 151 partakes of a relatively small arcuate motion under the control of cam 147. But the links 157—158 insure, during the upward stroke of the plunger, a nicely balanced and positive application of driving force to the carrier 163 and hence to the plunger, and thus each pin may be dependably pressed or forced into the above-described anchoring relationship to the material forming the walls of its hole H in the sleeve 20, and moreover, each one of the numerous pins becomes positioned at exactly the same distance from the axis of the sleeve 20 so that the centers of mass of all of the pins are equidistant from that axis and with equal spacing about the circumference of the sleeve 20, nicety of dynamic balance results.

In Figures 1 and 5, the plunger 45 is shown in its uppermost position, the cam 147 having its highest point in engagement with the cam roller 148, it being noted that as the plunger moves from the position shown in Figure 7 to that shown in Figure 5, throat elements 81 and 82 are displaced in counterclockwise and clockwise directions, respectively, by the action of the plunger 45 itself, the bias of the throat elements urging and holding them against the sides of the plunger 45, as shown in Figure 5, and biasing and moving them back into the positions shown in Figure 7 as the plunger recedes or moves downwardly from the position of Figure 5 to that of Figure 7.

During the upward stroke of plunger 45, the mandrel 39 and hence sleeve 20 are held in fixed position with the next succeeding hole H of that particular helix or row presented to and fixedly held in line with the upwardly moving pin carried by the plunger, and as the plunger recedes and hence moves downwardly as a result of movement of cam 147 in counterclockwise direction from the position shown in Figure 1, it being noted that the weight of the plunger 45, carrier 163 and lever 151 insure biasing of the cam follower always into engagement with the cam 147, cam 116 (Figures 1 and 5) continues to hold gate 136 closed, the cam follower 118 thereof being still on a low part of the cam, while cam 117, having opened the gate 135 (Figures 5 and 6) shortly after cam 116 has closed the gate 136, such closure having taken place shortly after release of a single pin while the plunger 45 is in its lowermost position, now moves the gate 135 in closing position, thus to hold back the row of pins P in the channel 101 to the right of the gate 135, and thus preparing for the release by gate 136 of the single pin held by the latter in advance or to the left of gate 135.

Following the withdrawal downwardly of plunger 45 from the pointed end of a pin just driven home by the plunger, cam 75 (Figures 1, 3 and 4) actuates the ratchet operating bar 67 (Figures 2, 3 and 4) in an upward stroke followed by a retrograde stroke (see the hump in cam 75 of Figure 1 displaced about 90° from the highest point of cam 147), thus to actuate the ratchet 66 to rotate the mandrel 39—40 throughout the angle subtended by two successive holes H in a row and by the coaction between the threaded block 47 and the threads of part 40 to advance the mandrel slidably along its support 36 by the right amount, locking pawl 60 acting to lock the rotated parts accurately in their new position.

By that time the lowest portion of cam 147, that portion being of about 90° extent and of about the same radius throughout, comes into coaction with the cam follower 148, thus to hold the plunger in its lowermost position as shown in Figure 7, with the throat forming elements 81—82 restored to coacting relation with the pin receiving socket 87 in the plunger, and just about when the plunger arrives at its lowermost position, a high portion of cam 116 rides the cam follower 118 upwardly to lift the gate 136, thus releasing the single pin that had been isolated between the two gates 135 and 136, that pin quickly moving down the channel extension 127 to be entered into the plunger recess 87 as was above described.

Then the gradually rising portion in the upper left-hand quadrant, as viewed in Figure 1, of cam 147, comes into action upon cam roller 148, progressively and steadily forcing the plunger to the uppermost extreme of its upward stroke to seat and embed the pin carried by it in the sleeve 20, but just about when that movement begins or shortly thereafter, cam 116 closes the gate 136 and shortly after such closure cam 117 opens gate 135 to permit the row of pins in channel 101 to slide downwardly to be stopped by closed gate 136, and shortly thereafter cam 117 closes gate 135 in order thus to place the single pin between it and gate 136 under the sole control of gate 136.

Such sequences of steps to constitute a complete cycle thus take place during a single revolution of main drive shaft 77 and of cam shaft 104, the ratio of driving connection between the two being 1 to 1, whence the cycle repeats itself in rapid succession, illustratively at a rate to anchor about 60 pins per minute.

The main drive shaft may be driven in any suitable manner, conveniently by way of an electric motor 171 which may be secured to the underside of base 25 as indicated at 172 in Figure 1, whence a drive chain 173 connects the motor sprocket 174 with a sprocket 175 mounted on the rear end of shaft 77.

Where the holes H in the sleeve member 20 are arranged helically, the operation is commenced, with the threads of part 40 as shown in Figure 1, at the right-hand end or terminus of the helix of holes in the sleeve 20, the latter being appropriately positioned in relation to the point of operation of plunger 45, for that purpose, by manually setting the structure 39—40 appropriately and relative to its support 36, the drive being halted for that purpose and the thread block 47 being withdrawn out of engagement with the threads of part 40, thus to permit manual sliding of the structure relative to the supporting shaft 36, while positioning of the mandrel structure in a rotary sense is permitted due to the yielding mounting of the locking pawl 60 and the yielding mounting of driving pawl 66 which, as seen in Figure 4, permits ease of manual rotation in counterclockwise direction. However, either or both of these pawl elements may be disengaged, if desired, for purposes of manual setting of the mandrel structure.

Having appropriately set it, the initial starting position is accurately fixed by the locking pawl 60 and by the inter-engagement of the threads of the block 47 and of the part 40, whence the drive of the apparatus is started, repeating the above-mentioned cycles until a complete helix of holes H is filled with pins, for example, the helix corresponding to the row $R^4$ of Figures 1 and 2. The drive may now be stopped, and the mandrel reset in relation to the point of operation of the plunger 45 to start action upon the next helix such as the helix $R^3$, it being noted that here the thread block 47 makes its re-engagement with the threads of part 40 in a relationship relatively displaced one with respect to the other by one thread of the part 40, that displacement corresponding to the axial spacing or displacement of the helix $R^3$ next to be filled with pins from the helix $R^4$ just filled, and upon completion of assembly of the pins to the second helix or row, the resetting of the mandrel structure 39—40 may again be effected in the manner just described and repeated according to the number of helixes of holes that remain to have pins anchored or assembled thereto.

As the supply of pins in the magazine structure 89 diminishes, more are added thereto and upon completion of assembly of pins to a sleeve member 20 carried by the mandrel 39, the apparatus is stopped, collar 42 of the mandrel 39 is released and the supporting standard 28 removed, whence the completed picker roll section is removed from mandrel 39 and another sleeve 20 slipped onto the mandrel 39 whence the collar 42 and the standard 28 are replaced, the new sleeve member 20 being properly fixed in position by the interlocking of its left-hand end portion (Figure 1) with the annular stepped shoulder 41.

With the sleeve element 20 and the pins P of materials or relative proportions as earlier above described, the resistance to entry of the pins into their respective holes in the hollow cylindrical or sleeve element 20 may be substantial, but the drive of the plunger 45 takes place under adequate force or pressure to force fit the pins, whether the latter are threaded or not, and dependably anchor them into the sleeve element, and where threaded pins are employed, such as the pin of Figure 9, the lower ends of the threads preferably terminate short of the butt end of the pin so as to leave a short axial length of unthreaded shank of the pin for nicety of initial guiding or entry of the shank into its hole, while the preferred rotary mounting of the plunger 45 in the carrier 163, as by the bore 164 and ball 165, gives such ease or facility of rotation to the plunger that, even under the substantial forces or pressures which it exerts, the rotary movement of the pin in cutting its own thread is transmitted to the plunger with so little resistance that damage or distortion to the fin-like cutting threads on the pin or to the threads which it cuts into the walls of the hole is minimized or guarded against.

Thus it will be seen that there has been provided in this invention an apparatus in which the several objects hereinabove set forth together with many thoroughly practical advantages are successfully achieved. The apparatus is of dependable action and capable of high speed of assembly, with good anchorage, of the large number of pins to each sleeve element, and is capable of ready and facile control. Also uniformity of distribution of the pins is assured, thus making for nicety of dynamic balance, each pin being anchored or fixed at the same distance from the axis of the sleeve element. Also the apparatus is capable of exerting, even though operating at substantial speed, the relatively large forces or pressures appropriate to achieve the desired embedding or anchoring of the pin shanks in the material of the sleeve element.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. An apparatus for anchoring pointed pins in a supporting element, comprising a reciprocable plunger having a recess at its upper end for receiving the end of a pin, separable throat elements overlying said end of said plunger when the latter is away from said supporting element and having means movably supporting them to permit movement of the plunger in its working stroke, means forming an inclined channel having at least a bottom wall and two side walls and terminating adjacent said throat elements, one of said throat elements having a recess with a lateral slot connected thereto, the walls of said throat element recess being substantially aligned with the walls of said plunger recess and the side walls of said slot being substantially aligned with the said side walls of said channel, the companion throat element having a part that enters said slot to form a continuation of said bottom wall of said channel, and means for effecting movement of said separable throat elements in timed relation to the strokes of said plunger.

2. An apparatus as claimed in claim 1, in which said means movably supporting said separable throat elements comprises pivotal supports for said throat elements supporting them for swinging movement toward or away from the line along which said plunger moves and which line substantially defines the path of movement of said plunger relative to said throat elements and means whereby said throat elements are biased in swinging inwardly toward said path of said plunger, whereby said throat elements are permitted to swing outwardly away from said path during the working stroke of said plunger and out of the way of the latter and to swing inwardly toward said path and into position over said end of said plunger upon retrograde stroke of the latter.

3. An apparatus for anchoring pointed pins in a support, comprising a reciprocable plunger having a recess at its end for receiving an end of a pin, means forming an extension of said plunger recess and comprising means movable into alignment with said end of the plunger when the latter is away from said support and movable out of the path of the plunger when the latter moves toward said support, and means operating in timed relation to the strokes of said plunger for supplying pins, one at a time, to said recess extension.

4. An apparatus for anchoring pointed pins in a support, comprising a reciprocable plunger having a recess at its end for receiving an end of a pin, means forming an extension of said plunger recess and comprising means movable into alignment with said end of the plunger when the latter is away from said support and movable out of the path of the plunger when the latter moves toward said support, means operating in timed relation to the strokes of said plunger for moving said movable means that comprise said recess extension, and means operating in timed relation thereto for supplying said recess extension means with a pin.

5. An apparatus for anchoring pointed pins in a support comprising means for movably supporting the support, a reciprocable plunger having a recess at its end for receiving an end of a pin, means for reciprocating said plunger and for effecting step by step movement of said support in timed relation to the reciprocation of said plunger, means forming an elongated channel for containing a line of pins in end to end relation and with their pointed ends extending in the same direction, and means operating in timed relation to the strokes of said plunger for transferring pins, one at a time, from the head end of said line to said plunger recess.

6. An apparatus for anchoring pointed pins in a support comprising means for movably supporting the support, a reciprocable plunger having a recess at its end for receiving an end of a pin, means for reciprocating said plunger and for effecting step by step movement of said support in timed relation to the reciprocation of said plunger, means forming an elongated channel for containing a line of pins in end to end relation and with their pointed ends extending in the same direction, said channel having guiding means for guiding a pin therefrom into said plunger recess when the plunger is in a position away from said support, two gate means spaced along said channel, and means operating in timed relation to the strokes of said plunger for operating said gate means sequentially for each cycle of plunger strokes to permit one by one release of pins to said guiding means and step by step advance of said line of pins along said channel.

7. An apparatus for forcing pins into the holes extending through the wall of a hollow cylindrical support, comprising a mandrel having a diameter to snugly receive thereover said cylindrical support and thereby close off the inner ends of said holes, a reciprocable member moveable in strokes toward and away from said mandrel and having a recess for receiving the outer end portion of a pin with its inner portion to be entered and force-fitted into a hole projecting from said member, means for effecting relative step by step movement between said mandrel and said member to bring the path of movement of said member successively into alignment with said holes, and means for effecting change in the spacing between the end of said reciprocable member and said mandrel in the general direction of the strokes of reciprocation of said member to thereby set the maximum approach of said member to said mandrel to a value to substantially bottom the end of the projecting portion of each pin against said mandrel, whereby the centers of mass of the pins force-fitted into their respective holes in said hollow cylindrical element are substantially equi-distant from its axis.

8. An apparatus for forcing pins having threads of relatively steep pitch into the holes extending through the wall of a hollow cylindrical support, comprising a mandrel having a diameter to snugly receive thereover said cylindrical support and thereby close off the inner ends of said holes, a reciprocable member moveable in strokes toward and away from said mandrel and having a recess for receiving a portion of a pin with the threaded portion projecting from the member, means for effecting relative step by step movement between said mandrel and said member to bring the path of movement of said member successively into alignment with said holes, said member having means mounting it for rotation about the axis of a pin held in said recess whereby said member may partake of rotary movement corresponding to the rotary movement of the pin as it threads its way into a hole during the working stroke of said member, said member having a working stroke of such length that all of the pins are threaded into the holes to the same extent whereby the centers of mass of the pins threaded into the respective holes of said hollow cylindrical element are substantially equi-distant from its axis.

9. An apparatus for forcing pins into the holes extending through the wall of a hollow cylindrical support, comprising a mandrel having a diameter to snugly receive thereover said cylindrical support and thereby close off the inner ends of said holes, pin-setting means comprising a reciprocable member and means guiding and activating it in strokes toward and away from said mandrel, said member having a recess for receiving the outer end portion of a pin with its inner portion to be entered into a hole projecting from said member, means for effecting relative step by step movement between said mandrel and said member to bring the path of movement of said member successively into alignment with said holes, and means operable upon said pin-setting means when the apparatus is at rest to change the relation between said reciprocable member and said mandrel for thereby changing the extent of approach of said member during its working stroke to said cylindrical support.

10. An apparatus for forcing pins into the holes extending into the wall of a hollow cylindrical support, comprising a mandrel for supporting said support coaxially therewith, mean for rotatably and slidably supporting said mandrel, a ratchet wheel having a driving pawl for rotating said mandrel and movable axially therewith, said driving pawl having an elongated operating element extending in the direction of slidable movement of said mandrel, a biased holding pawl for said ratchet wheel, said holding pawl being of a length commensurate with the range of sliding movement of said ratchet wheel and having means mounting it to extend in the direction of said sliding movement, a reciprocable member for forcing a pin on its working stroke into a hole in said cylindrical support, and means operating in timed relation to the strokes of said member and operating at a relatively fixed point in the path of movement of said elongated pawl operating member to actuate the latter.

11. An apparatus for forcing pins into the holes extending into the wall of a hollow cylindrical support, comprising a mandrel for supporting said support coaxially therewith, means for rotatably and slidably supporting said mandrel, a ratchet wheel having a driving pawl for rotating said mandrel and movable axially therewith, said driving pawl having an elongated operating element extending in the direction of slidable movement of said mandrel, a holding pawl for said ratchet wheel, said holding pawl being of a length commensurate with the range of sliding movement of said ratchet wheel and having means mounting it to extend in the direction of said sliding movement, threaded means for controlling the sliding movement of said mandrel and comprising an externally threaded cylindrical element rotatable and slidable with said ratchet wheel and a relatively fixed nut element, a pin-forcing member having means for driving it in successive cycles that comprise a working stroke toward said cylindrical support and a retrograde stroke, and means operating in timed relation therewith and comprising an actuating element positioned along the path of movement of said elongated pawl operating member for actuating the latter to effect rotary movement of said mandrel and of said threaded element to thereby also effect sliding movement of said mandrel.

12. An apparatus for forcing pins into the holes arranged in multiple helical rows in the wall of a cylindrical support, comprising means for supporting said support for rotary movement about its axis and for movement in the direction of its axis, pin-forcing means moveable in strokes toward and away from said cylindrical support, means operating in timed relation therewith to effect step by step rotary movement of said supporting means, and means for effecting axial movement thereof comprising a cylindrical member externally threaded in multiple threads corresponding in number to the number of multiple helical rows of holes and a nut element coacting therewith, said multiple-threaded cylindrical member and said nut element having means mounting them for relative disengaging and axial-shifting and re-engaging movements whereby, upon relative disengaging movement therebetween, said supporting means may be given such axial displacement relative to said nut element to interrelate them, upon subsequent relative re-engaging movement therebetween, that the nut element is re-engaged to coact with the multiple-threaded cylindrical member to effect axial displacement of said supporting means during subsequent step by step rotary movement relative to the position of said pin-forcing means along the helix corresponding to that one of the several helical rows of holes of said cylindrical support as it is desired to bring into operative relation to said pin-forcing means.

13. In an apparatus for forcing pins or the like, comprising a reciprocable plunger having a recess at its end for receiving an end of a pin, means for guiding a pin to said plunger recess and forming an upward extension of said plunger recess and comprising separable throat elements having means pivotally supporting them in the path of the working stroke of said plunger, whereby movement of the plunger in said working stroke separates them, and means whereby they are biased to pivot toward each other upon movement of the plunger in its retrograde stroke.

14. An apparatus for setting pins or the like comprising a moveable member having a recess for receiving the end of a pin, a guideway for guiding the pin toward said recess and positioned out of the path of movement of said element, and separable throat elements intermediate of the end of said guideway and of the recess in said element when the latter is in pin-receiving position, said throat elements forming a guiding throat for guiding a pin from said guideway into said recess, means mounting said throat elements for movement of separation in response to motion of said moveable element, thereby to avoid obstruction of the latter.

15. An apparatus for setting pins or the like comprising a moveable member having a recess for receiving the end of a pin, a guideway for guiding the pin toward said recess and positioned out of the path of movement of said element, and means for guiding a pin from said guideway to said recess comprising moveable and separable throat elements intermediate of the end of said guideway and of the recess in said element when the latter is in pin-receiving position, said throat elements forming a guiding throat for guiding a pin from said guideway into said recess, said moveable and separable throat elements being positioned in the path of movement of said moveable element for guiding a pin from said guideway into said recess, means whereby said moveable throat elements are biased into the path of said moveable element, and means whereby said moveable element, upon movement thereof, effects separation of said throat elements.

16. An apparatus for setting pins or the like comprising means for holding and moving a pin for setting it into and object, said means including a moveable member having a recess for receiving the end of a pin and having means for moving it in a working stroke and a retrograde stroke, a plurality of moveable throat elements positioned in the path of movement of said member and forming an extension of said recess for guiding a pin into the recess, and means for controlling the movement of said throat elements into recess-extension-forming relation to said member to guide a pin into its recess and out of the path of said member to permit the latter to carry the pin in pin-forcing direction during its working stroke.

17. An apparatus for setting pins or the like comprising means for holding and moving a pin for setting it into and object, said means including a moveable member having a recess for receiving the end of a pin and having means for moving it in a working stroke and a retrograde stroke, a plurality of moveable throat elements positioned in the path of movement of said member and forming an extension of said recess for guiding a pin into the recess, said members having means mounting them pivotally for movement into and out of the path of movement of said member, and means whereby said throat elements are activated into and out of said path in timed relation to the strokes of said member.

18. An apparatus for anchoring pins in a support comprising a member having a recess for receiving a pin and being moveable in a path toward and away from said support, a guideway for pins terminating at one side of said path, means forming substantially an extension of said recess and having a guideway portion forming substantially an extension of said guideway to extend the latter into said recess extension, means operating to interpose said first-mentioned means between said guideway and said member to charge the recess of the latter with a pin from said guideway at a suitable point in the movement of said member, and means effective, subsequent to the activation of said last-mentioned means to remove said first-mentioned means out of the path of said member to permit the latter with the pin therein to move toward said support.

19. An apparatus for anchoring pins in a support comprising means for supporting the support, a pin-forcing member having means for holding a pin, means for effecting relative movement in successive steps between said supporting means and said pin-forcing member to effect successive pin-forcing operations and for effecting step by step relative movement therebetween in timed relation to the pin-forcing operations, means forming an elongated channel for containing a line of pins in end to end relation and with their pointed ends extending in the same direction, said channel having guiding means for guiding a pin therefrom into said pin-holding means of said member when the latter and said supporting means are relatively separated, two gate means spaced along said channel, and means operating in timed relation to said pin-forcing operations for operating said gate means sequentially to permit one by one release of pins to said guiding means and step by step advance of said line of pins along said channel.

PAUL SCHULTZE.